United States Patent [19]

Oxenreider

[11] 4,173,326
[45] Nov. 6, 1979

[54] CAST ON MOLD INSERTS

[75] Inventor: Terry R. Oxenreider, Wernersville, Pa.

[73] Assignee: General Battery Corporation, Reading, Pa.

[21] Appl. No.: 819,695

[22] Filed: Jul. 28, 1977

[51] Int. Cl.² .............................................. B22D 19/00
[52] U.S. Cl. ................................. 249/83; 164/DIG. 1; 425/123
[58] Field of Search .................. 249/83, 85, 88, 91; 425/121, 123; 164/DIG. 1, 332

[56] References Cited

U.S. PATENT DOCUMENTS

| | | | |
|---|---|---|---|
| 593,534 | 11/1897 | Comley | 249/83 X |
| 2,306,732 | 12/1942 | Huxham | 249/83 X |
| 2,496,991 | 2/1950 | Galloway | 249/83 X |
| 3,366,995 | 2/1968 | Dijken et al. | 249/83 X |
| 3,510,912 | 5/1970 | Lane | 425/123 X |

Primary Examiner—William R. Briggs
Attorney, Agent, or Firm—Benasutti Associates, Ltd.

[57] ABSTRACT

A novel mold having a plurality of channels for casting battery straps and posts on groups of battery positive and negative plates, the mold being equipped with a projection on at least one end of each of the channels, the projections extending into the channels of the mold toward the opposite end of the channel. The lengths of the mold channels are slightly less than the lengths of rows of positive or negative lugs so that the elements of the battery group are gently compressed or squeezed together. The end walls of the mold channels extend beyond the main mold body, a portion of the extended walls being beveled in a direction away from the mold channels.

11 Claims, 8 Drawing Figures

CAST ON MOLD INSERTS

BACKGROUND OF THE INVENTION

I. Field of the Invention

This invention relates to the manufacturing of lead storage batteries, specifically to the step of casting-on battery straps and posts to rows of positive and negative lugs of groups of battery elements.

II. Description of the Prior Art

A modern lead storage battery starts with a battery case having cells formed therein by partitions or walls located within the battery case. Within each cell there is located a series of battery plates and separators which together form a group. The battery plates comprise positive and negative grid-like plates, which are coated with a lead oxide paste to give the battery the potential of holding the electric charge. The plates are of positive and negative character and alternate in sequence. Separators are positioned between each of the plates to isolate them from one another. Before the group is formed and placed in the cell, the plates and separators are arranged into a stack, each of the plates having an extension called a lug on one end, the positive lugs forming a row on one side of the stack and the negative lugs forming a row on the opposite side. The row of positive lugs must be connected together, and the row of negative lugs must be connected together to form the group. Several methods have evolved over the years for accomplishing this task, and a popular method is known as the cast-on method where the stacks of battery plates are carried over and lowered into a mold having a suitable channel to receive the rows of positive and negative lugs. The channels are filled with molten lead which surrounds the rows of lugs and when the lead solidifies, the lugs are molded together to form a casting known as a battery strap.

Each of the groups within the battery cells must be connected together either by connecting over or through the battery partition walls. In order to accomplish this, one end of the strap is molded to include an extension known as an intermediate post or intermediate lug. In the intercell method the intermediate posts are lined up on each side of the partitions and a connection is made between the intermediate posts through apertures in the partition walls. To facilitate a good connection, the faces of the posts facing each other with the battery partition in between are substantially flat and parallel.

The Farmer U.S. Pat. No. 3,604,094 describes a casting station in a battery element fabricating machine. The casting station comprises a mold block and dams which are mounted at the top of the mold block. The dams have recesses or cavities for receiving the molten lead which will be cast as the strap portions on the battery groups. In addition, mold recesses are provided in the mold block adjacent to, and in communication with, the strap cavities so that the post portions will be integrally cast with the straps. FIGS. 6 and 7 show the mold block 124; the dams 126; the dam recesses or cavities 127; and post recesses 128 and 129.

In FIG. 7 of the Farmer U.S. Pat. No. 3,616,845, a molding station is described comprising a mold block 94 having a strap portion cavity 142 and a post portion cavity 144. The remaining portion of the cavity is formed by a movable wall 146 having a flat surface 150 with a recession 148 therein. The recession 148 acts to form a projecting stud on the face of the post portion of the casting. The wall 146 is movable away from the face of the casting at the time when the casting is to be removed from the mold. This wall is pivotable away from the casting so that the projecting stud can be removed along with the casting.

Other U.S. patents dealing with the casting of straps and posts on the groups of insulated battery plates are the Vieth U.S. Pat. No. 2,799,905 and the Lutz U.S. Pat. No. 700,959.

One of the problems which has been encountered in casting on the straps and posts to a battery stack is that the endmost plate lug when inserted into the mold channel for casting, may be engaged by lead only on one side and its edges since one face or side of that lug is pressed firmly up against a flat end of the mold and does not otherwise cast to the remaining portion of the strap. While upon removal of the group or element from the cast-on operation it might first appear that the strap of the battery group or element did integrally fuse with the battery lugs, including the lug of the endmost plate, it is found that, upon subsequent processing, these endmost plate lugs have a tendency to crack or peel away from the remainder of the group element and to otherwise exhibit somewhat inferior properties.

Another problem which arises is the formation of unwanted projections on the face of the post portion of the strap casting, the projection being a result of overfilling of the cavity with molten lead. In particular, the formation of these projections would prevent the face of the post from being connected to an adjacent intermediate post through the battery partition.

SUMMARY OF THE INVENTION

The preferred embodiment mold assembly of applicant's invention is capable of casting a plurality of battery straps simultaneously, for example, the casting of straps on stacks of plates for an entire battery including both terminal post straps and intermediate post straps. The rows of positive and negative lugs of the stacks are placed in two parallel series of channels located in a mold block. In order to separate the rows of lugs of the various groups from one another and to accommodate various size batteries having varying widths of rows of lugs, the channels are formed by a series of fixed mold portions and removable mold insert portions positioned within a surface of the mold block. The variation of the size of the insert portions changes the size of the individual channels in accordance with the size of the battery straps to be cast.

In the preferred embodiment, a projection extends from one or both ends of the insert portions into the channels in a direction away from the insert portion. When the row of plate lugs is placed into the channel, the endmost plate lug adjacent the projection engages the projection and a space is created between the outward surface of the endmost plate lug and the remaining flat surface of the end of the insert portion. When molten lead is introduced into the channels, it flows around the outwardly facing surface of the endmost plate lug between this surface and the end surface of the mold insert portion. This insures an integral casting of that lug with the remaining strap since molten lead is allowed to surround a substantial portion of the endmost plate lug.

Occassionally, more molten lead is introduced into the channel than the channel can accommodate, and, in the case of the intermediate post strap castings which contain flat surface intermediate post portions, this extra quantity of molten lead can overflow the top of the strap to form unwanted projections on the outwardly facing surface or face of the intermediate post portions. To insure that this does not happen, the width of the ends of the fixed and insert mold portions are larger than the width of the channel along the channel's length. The extra molten lead then, flows along the strap width instead of overflowing along the length of the strap to form these unwanted projections. In addition, the height of the ends of the fixed and insert mold portions extend above the surface of the mold block thereby forcing the extra molten lead to flow along the width of the channel.

A portion of the height of the ends of the fixed and insert mold portions extending above the mold surface are beveled in a direction away from the mold channels. When a row of plate lugs is introduced into a single channel, the endmost lugs will encounter the beveled surface of the end portions and be gently squeezed together as the row is introduced in the channel. This insures a positive mating of the row of lugs with the channel and an integral casting of the strap to the array of lugs.

In the case of the casting of an intermediate post strap, the mold channels are of a shape which results in a longitudinal strap portion to the casting which runs along the surface of the mold and an intermediate post portion which extends generally perpendicularly away from the strap portion into the mold block. The post portion of the strap casting is at one end of the strap against a fixed mold portion surface opposite the projection in the mold channel. Similarly, in the terminal post castings, the terminal post portion is cast in a direction generally perpendicularly away from the strap portion of the casting, but, unlike the intermediate post strap casting, the terminal post portion is located intermediate the ends of mold channel.

Accordingly, it is an object of the present invention to provide a mold apparatus which prevents the peeling of the endmost plate lugs from the final strap casting.

It is another object of the present invention to provide a mold assembly which prevents unwanted projections on the intermediate post end faces during the casting process.

Another object of the present invention is to provide a mold assembly which gently guides the row of plate lugs into the cavity and insures an integral strap casting.

It is another object of the present invention to provide a mold apparatus for the simultaneous casting of a plurality of intermediate post and terminal post straps.

Another object of the present invention is to provide a mold apparatus which is easily adaptable to the casting of various size battery straps through the use of mold inserts.

This and other objects of the present invention will become apparent from the following description with reference to the accompanying drawings.

BRIEF DESCRIPTION OF THE DRAWINGS

FIG. 3 is a top planar view of the preferred embodiment mold apparatus showing the alignment of fixed and insert mold portions;

DETAILED DESCRIPTION OF THE DRAWINGS

Figure 1:
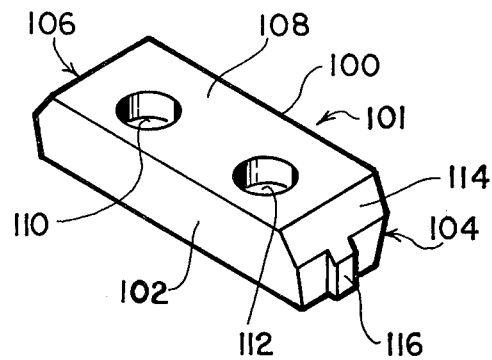
FIG. 1 is an enlarged perspective view of a preferred embodiment mold insert portion having projections at both ends.

Although specific forms of the invention have been selected for illustration in the drawings, and the following description is drawn in specific terms for the purpose of describing these forms of the invention, this description is not intended to limit the scope of the invention which is defined in the appended claims.

FIG. 3 is a top planar view of the preferred embodiment mold apparatus designated generally 10. A mold block designated generally 12 forms the main support and structure of the apparatus. The mold block 12 in the preferred embodiment is generally rectangular in shape with long sides 16 and 18 and shorter sides 20 and 22. One surface of the mold block 12 comprises a wide flat-bottomed channel 14 which runs from end 20 of the block to the opposite end 22, and flat ledge surfaces 13 and 15 on either side of the channel 14 and spaced apart from the bottom of the channel. Running along both sides 16 and 18 is a series of mold cavities or mold channels 24 through 46 which extend into the ledge surfaces 13 and 15 of the block, the channels 24 through 34 being aligned in series along wall 16. These channels comprise the positive channels and are so marked with a projection formed in the shape of a "plus sign" and located at the bottom of the channels where they leave a "plus sign" indentation in the top surface of the resultant strap casting for ready identification. Similarly, the channels 36 through 46 are aligned along the opposite wall 18 and form the negative channels. In the arrangement shown in FIG. 3, a positive channel is always shown opposite a negative channel and the positive and negative channels form a series of parallel pairs, for example, channels 24 and 36 are parallel to channels 26 and 38 etc.

There are two varieties of channels for casting in the preferred embodiment mold apparatus 12. Mold channel 42 is an intermediate post channel having side walls 48 and 50 and end walls 52 and 54. Mold channel 36 is a terminal post mold channel with side walls 56 and 58 and end wall 60 and 62. In the preferred embodiment mold apparatus of FIG. 3, only one other channel, 34, is a terminal post channel, the remaining channels being intermediate post channels.

The end walls of each of the individual channels, such as 36 and 42, are formed by mold portions, the mold portions consisting of two varieties. There are fixed mold portions which are permanently attached and form a part of the mold block itself. These are mold portions 64 through 74 in FIG. 3. In channel 42, wall 52 is the end wall of fixed mold portion 72.

Besides fixed mold portions, the mold apparatus comprises removable insert mold portions 76 through 92. The remaining wall 54 of channel 42 is an end wall of insert mold portion 90. Hence, the channel 42 demonstrates each of the types of walls present in the mold block, for example, side walls 48 and 50 and end walls 52 and 54.

The end wall of each insert mold portion which forms an end wall of one of the mold channels comprises a projection such as 94 on wall 54 of insert portion 90. The projections extend away from the end walls of the insert mold portion into the channels.

Figure 4:
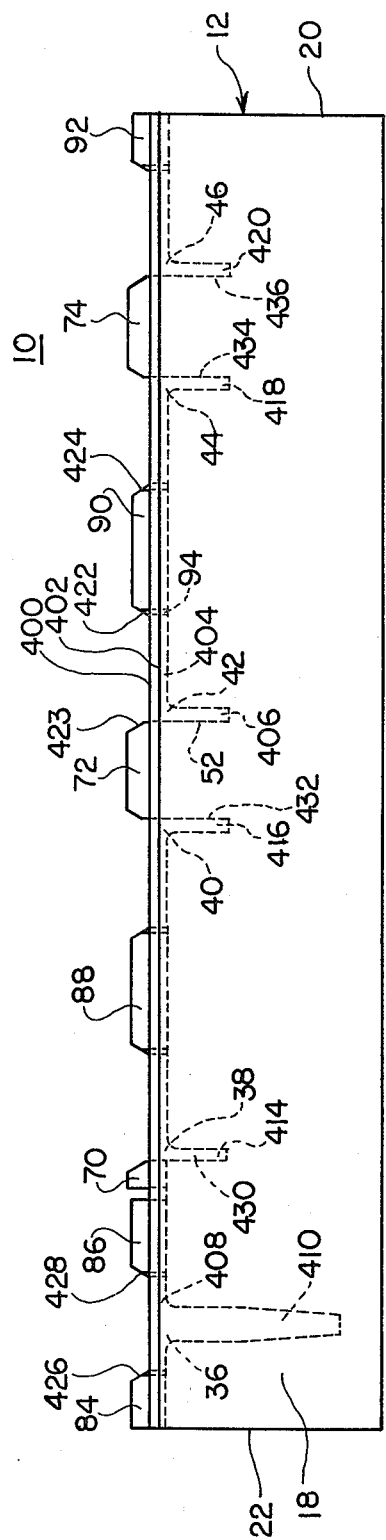
FIG. 4 is a front elevational view of the preferred embodiment mold apparatus taken along the lines and arrows 4—4 in FIG. 3.

The depth of the channels within the mold block can be described by referring to FIG. 4, which is an elevational view of the mold apparatus taken as indicated by the lines and arrows 4—4 in FIG. 3. The edge of the preferred embodiment mold block 12 running along the side 18 and forming one edge of the ledge portion 13 of FIG. 3 is beveled and denoted by the parallel lines 400 and 402 in FIG. 4. The opposite edge along side 16 is similarly beveled. The channels are shown as dotted lines in FIG. 4, and channel 42 comprises: a strap portion 404 which lies along the ledge surface 13 of FIG. 3 of the mold block 12 and an intermediate post portion 406 which is generally transverse to the strap portion 404 and extends into the mold block 12. The channel 36, which is a terminal post channel, comprises: a strap portion 408 similar to the strap portion 404 lying generally along the ledge surface 13 of FIG. 3, and a terminal post portion 410 which lies generally transverse to the strap portion 408 and extends into the mold block 12 like the intermediate post portion 406. However, the terminal post portion of cavity 36 (and channel 34), unlike the intermediate post portion 406, lies intermediate the end portions of the channel 36.

The intermediate post portion 406 of channel 42 lies at one end of the channel 42. The intermediate post portion 406 has a flat face which lies along the flat wall 52 of fixed mold portion 72 of the mold apparatus. The remaining intermediate post portions in FIG. 4 are labelled 414 for channel 38; 416 for channel 40; 418 for channel 44 and 420 for channel 46.

All of the fixed mold portions and insert mold portions of the mold apparatus extend substantially above a surface of the mold block 12, in particular, in the preferred embodiment, above the surfaces of the ledge portions 13 and 15. In FIG. 4, the mold insert portions 84, 86, 88, 90 and 92 are shown extending above the line 400 and the fixed mold portions 70, 72 and 74 are similarly shown. The mold insert portions, of course, have projections extending from either one end or both ends as, for example, projection 94 on mold insert portion 90 shown dotted and extending into the channel 42 from one end. It is also apparent that the fixed and insert mold portions have some end portions which are beveled in a direction away from the mold channels. For example, mold insert portion 90 has a beveled surface 422 shown beveled away in a direction from the channel 42. Similarly, the other end of the insert portion has a beveled surface 424 shown beveled away from the channel 44. In mold cavity 36, the mold insert portion 84 has only one beveled surface 426 which is shown beveled away from the cavity 36. Insert mold portion 86 has only one beveled surface 428, also shown beveled away from the mold channel 36. The remaining fixed and mold insert portions have beveled surfaces on those ends which form channel walls within the mold block. Where each end of a mold insert portion forms a portion of a channel within the mold block, that mold insert portion has a projection and a beveled surface on each end. Similarly, where each end of a fixed mold portion helps to form a mold channel within the mold block, then each end has a beveled surface.

Figure 2:
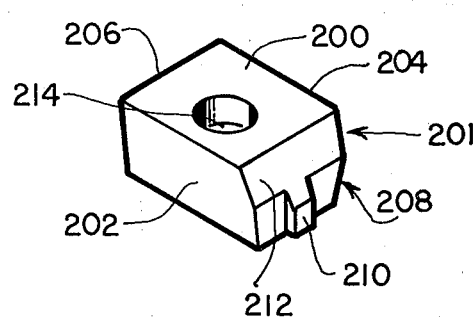
FIG. 2 is an enlarged perspective view of a preferred embodiment mold insert portion having a projection at one end.

FIGS. 1 and 2 provide a closer look at the mold insert portions. In FIG. 1, the double projection mold insert portion designated generally 101 is shown in a perspective view. It is generally a rectangular block having long sides 100 and 102 and end portions designated generally 104 and 106. Only end portion 104 can be seen in detail in FIG. 1, but end portion 106 is identical. The mold insert portion 101 has a flat surface 108 with holes 110 and 112 therethrough, for example, which serve to provide attachment by screw or bolt to mold block 12. The end portions 104 and 106 have surfaces such as surface 114 beveled away from the end of the mold insert portion. A projection such as projection 116 extends away from the portions 104 and 106 of the mold insert portion 101. The top of the projection 116 is also beveled and meets the surface 114 on the same incline to form a part thereof.

The mold insert portion designated generally 201 shown in FIG. 2 serves a similar function to the double projection mold insert portion 101 of FIG. 1 and has a generally flat surface 200 and side walls 202 and 204. The single projection mold insert portion 201 of FIG. 2 has a single flat end portion 206 and a beveled end portion designated generally 208 having a projection 210 thereon. The end portion 208, like end portion 104 on insert portion 101, has a beveled surface 212 extending away from the end of the mold insert portion. The signal projection mold insert portion 201 has a hole 214 for allowing ready attachment of the mold insert portion to the mold block 12.

Figure 5:
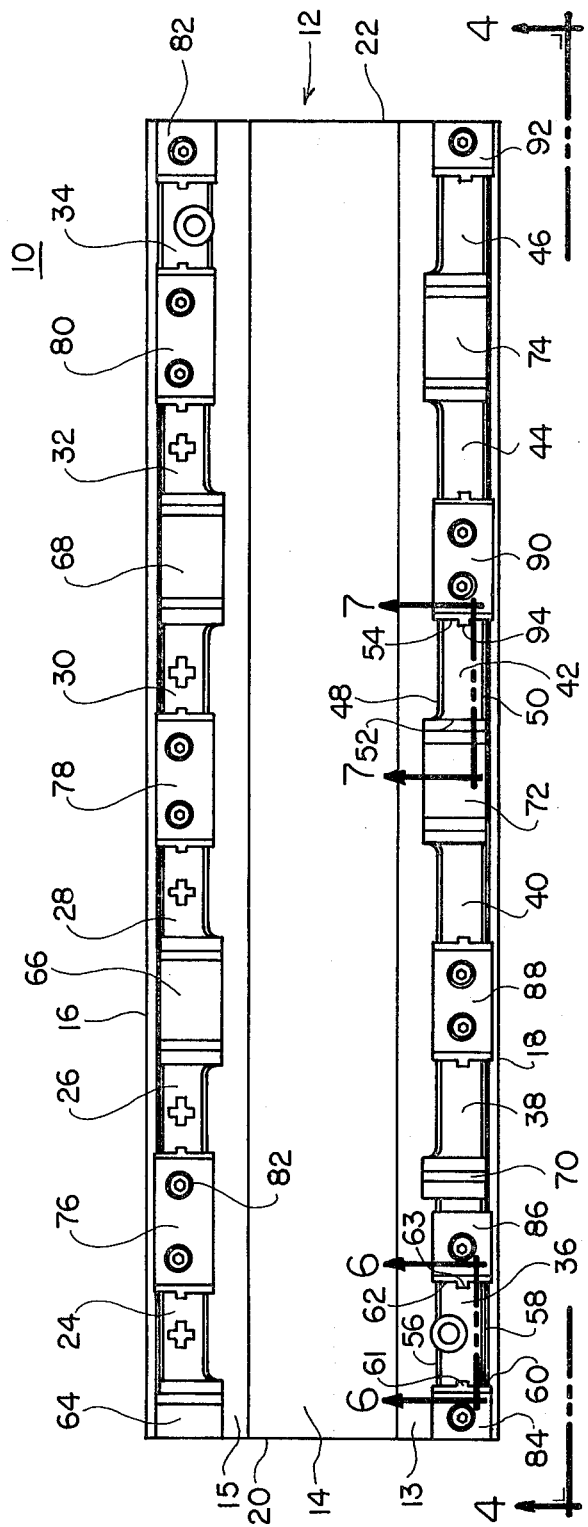
FIG. 5 is a side elevational view of the preferred embodiment mold apparatus showing a battery with rows of lugs in position in the mold assembly, the battery shown in phantom, and also showing a hidden intermediate post and terminal post cavity portion within the mold apparatus.

FIG. 5, which is an end view from end 22 of the apparatus, shows the intended way that a battery would be used with the preferred embodiment mold apparatus 10. The battery shown in phantom as 502 in FIG. 5 is upside down with rows of positive and negative plate lugs opposite one another shown extending beyond the open top battery. Positive rows, for example, are indicated as 504, and negative rows as 506. These rows fit into the channels aligned along the walls 16 and 18, respectively. One stack of battery plates would have one set of positive rows in channel 24, for example, while the opposite row of negative lugs of the battery stack would be inserted in channel 36 which happens to be a terminal post channel. The terminal post portion 410 of the channel 36 is shown in FIG. 5 by a dotted lines. Similarly, the intermediate post portion 504 of the channel 24 is shown by a dotted line in FIG. 5. Both of these channel portions extend down into the mold block 12. Seen from an end view, the fixed mold portion 64 is shown along with the mold insert portion 84.

Figure 6:
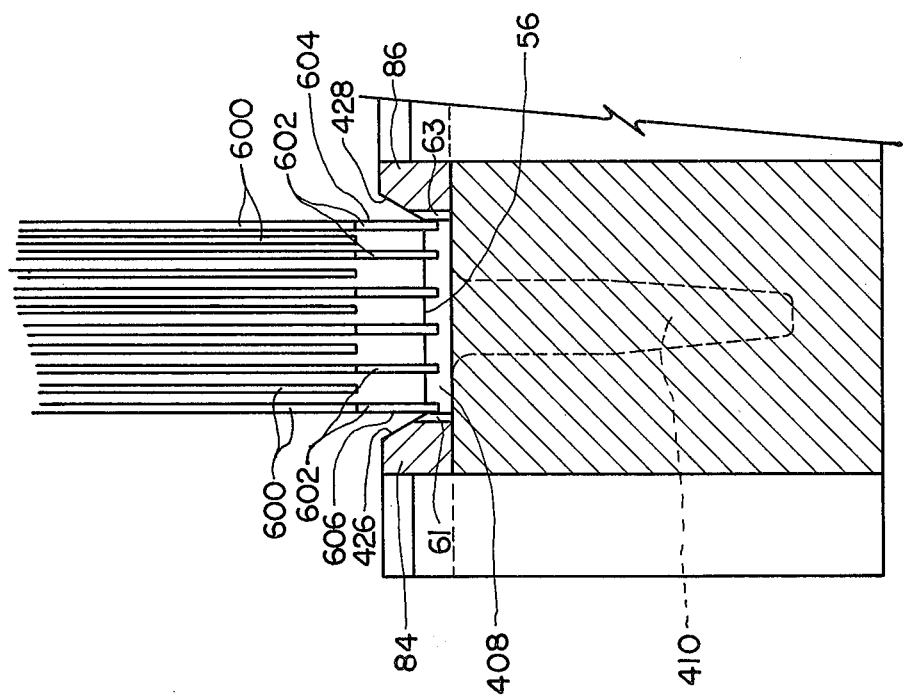
FIG. 6 is an enlarged cross-sectional view of a portion of the preferred embodiment mold apparatus taken along the lines and arrows 6—6 in FIG. 3 and showing a battery stack inserted in position between mold insert portions of the mold apparatus.
Figure 5:
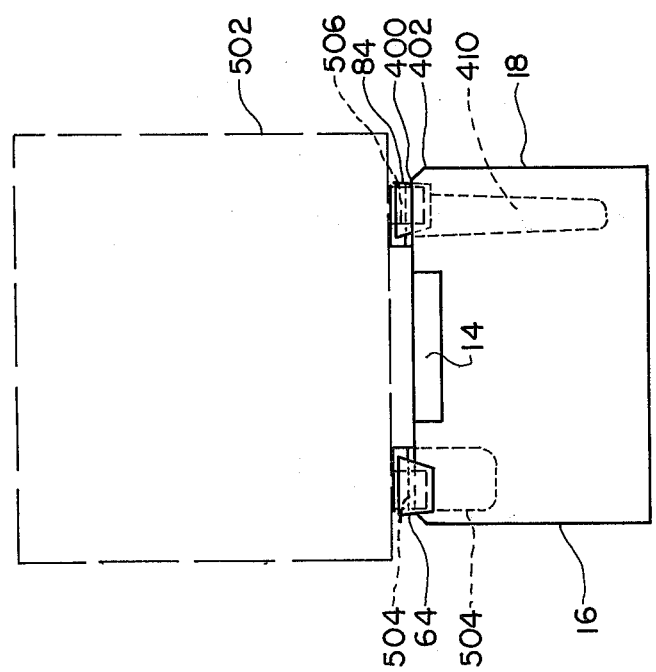

FIG. 6 is a cross-section of a portion of the mold apparatus taken as indicated by the lines and arrows 6—6 in FIG. 3 and centered at channel 36. The plates 600 of a single stack of a battery are shown in cross-section with the lugs 602 of the positive plates extending into the strap portion 408 of channel 36, the terminal post portion 410 is shown dotted. The side wall 56 along with the end portions of mold insert portions 84 and 86 is also shown, the insert portions 84 and 86 having projections 61 and 63 extending into the channel 36. A portion of the end portions of the insert portions 84 and 86 extending above the mold block surface have beveled surfaces 426 and 428, respectively. As molten lead is introduced into the channel 36, it flows around each of the lugs 602 and forms a strap in the strap portion 408 of the channel. This strap casting connects each of the individual lugs of that stack together. The purpose of the projections 61 and 63 is to insure that lead will surround those portions of faces 604 and 606 which extend into strap portion 408 of channel 36 thereby insuring that these endmost lugs are formed integrally with the strap.

Referring to FIGS. 3 and 6, it will be observed that the projections 61 and 63 formed on the mold insert portions 84 and 86 (and similar projections in terminal post channel 34) are considerably smaller in width than the end walls 60 and 62 of the insert portions and the width of channels into which they protrude. This will allow lead to run between the end of the lug face 604 and 606 and the flat portions of the walls 60 and 62 of the mold insert portions thereby surrounding a considerable portion of the outside lugs 602. If these projections were not located on the end walls of the insert mold portions and the walls were flat surfaces, the molten lead would not surround the endmost lugs to encompass a portion of the faces 604 and 606 of the lugs and when this happens, the lug has been found on occasion to peel away from the strap.

Figure 7:
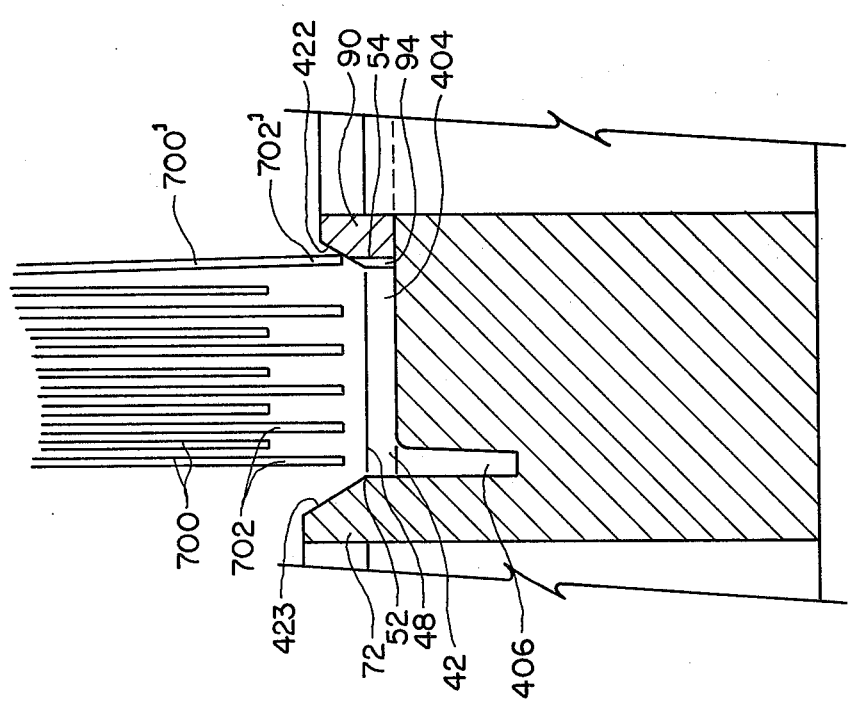
FIG. 7 is an enlarged cross-sectional view of a portion of the preferred embodiment mold assembly taken as indicated along the lines and arrows 7—7 in FIG. 3 and showing a battery stack above the mold assembly ready for insertion between a fixed mold portion and an insert mold portion.

FIG. 7 is a similar view as that of FIG. 6 taken as indicated by lines and arrows 7—7 in FIG. 3 centered at intermediate post channel 42. Channel 42 comprises strap portion 404 and intermediate post portion 406. Also shown is side wall 48; fixed mold portion 72 with end wall 52; and insert mold portion 90 with end wall 54 and projection 94. Battery plates 700 with lugs 702 are ready for insertion into the channel 48. Plate 700' with lug 702' is shown separating away from the remainder of the stack. This often happens and, to insure that all of the plates are properly aligned and positioned in the mold before the strap is cast onto the lugs, the end portions of the fixed and insert mold portions 72 and 90, respectively, are beveled as in FIG. 6. The beveled surfaces 422 and 423 slant away from the channel 42. Hence, as the plate lugs are lowered into the channel, the endmost lugs engage the beveled surfaces 422 and 423 and slide down the beveled surface toward the channel. Since the length of the strap portion 404 of the channel 48, that is, the separation between projection 94 and end wall 52, is slightly less than the overall width of the row of lugs 700, the lugs are gently compressed together between the projection 94 and end wall 52. A similar alignment and compression of the lugs takes place in each of the remaining channels as a result of the beveled surfaces on the end portions of the fixed and insert mold portions extending beyond the mold block 12 and the projections on the ends of the mold insert portions within the mold channels.

A portion of projection 94 is beveled to meet with surface 422 and the projection serves the same function as the projections 61 and 63 of FIG. 6 as discussed earlier. In fact, throughout the preferred embodiment mold apparatus 10, wherever the end of a channel does not result in an intermediate post portion, a projection will be found on the end of the channel to insure that the endmost plate lug is integrally cast with the strap casting. However, it is impossible to place a projection where the casting has an intermediate post portion since the intermediate post portion must have a flat face to properly mate through an aperture in a partition wall in the battery. If there were a slot or groove formed in the face of the intermediate post portion as a result of a projection having been located on the mold end, then a faulty intercell connection between opposite lugs through the partition wall might result since insufficient lead would be present in the lug to be extruded into the aperture or otherwise connected to the opposite lug. For example, in the preferred embodiment mold apparatus, none of the end walls of the fixed mold portions forming a wall of a channel comprise a projection since this end wall extends deep into the mold block to form the face of an intermediate post lug such as end walls 430, 432, 52, 434 and 436 in FIG. 4.

The end walls of each of the channels in the mold apparatus are wider than the width of the channels along the lengths of the channels intermediate the ends. For example, in channel 42, the width of end walls 52 and 54 are greater than the separation of substantially parallel and spaced apart side walls 48 and 50. Because of this and the extended dimension of the end portions of the fixed and insert mold portions above the mold block, any excess molten lead poured into an individual channel flows onto the surface of ledge portions 13 or 15 of the mold block 12 guided by the wider end walls. This prevents the formation of unwanted projections on the face of the intermediate post portions of the mold channel preventing overflow of molten lead over the ends of the channel. Unwanted projections on the face of the intermediate post portion, when they occur, interfere with the alignment of the intermediate posts and battery partition walls.

Figure 8:
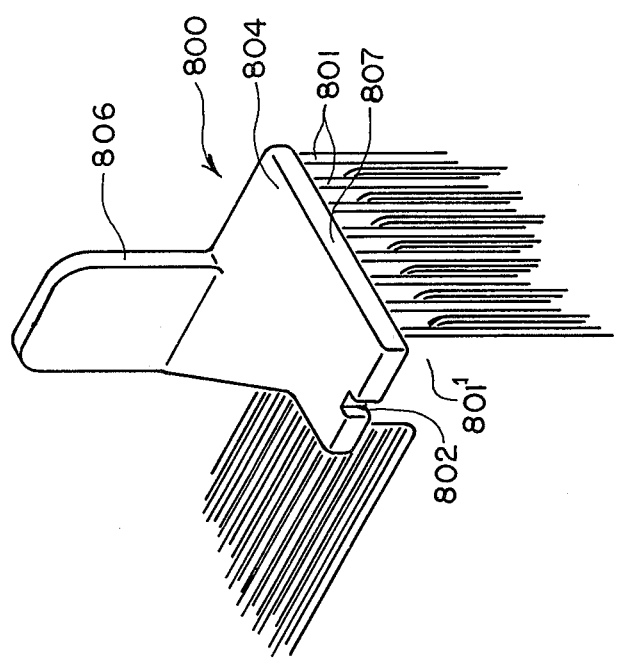
FIG. 8 is an enlarged perspective view of an alternate embodiment strap casting having an intermediate post portion.

An alternate embodiment intermediate post strap casting designated generally 800 is shown in FIG. 8 connecting the lugs 801 of a group of battery elements. The result of the projection on one end wall of the mold channel on the casting 800 is shown as indentation 802 in FIG. 8. The strap portion 804 of the casting 800 is shown connecting the tops of the lugs 801 of the stack of battery plates. The intermediate post portion 806 is shown extending perpendicularly away from the strap portion 804. The endmost lug 801' is integrally within the strap. When the casting is complete, the battery is removed and the casting slides out of the battery, the projection of the mold sliding along the indentation 802. FIG. 8 shows an alternate embodiment of the intermediate post strap casting since the post portion 806 is shown substantially displaced from the edge 807 of the strap portion 804.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A mold for forming battery straps on substantially parallel and spaced apart rows of positive and negative lugs of a stack of battery elements, comprising:
    (a) a mold block having at least two mold channels disposed in a surface of said block to receive said rows of positive and negative lugs, each mold channel having end walls, a portion of which extend beyond the surface of said mold block, each said portion including a segment which is beveled away from said mold channel, the width of each portion extending beyond the width of said channel whereby excess molten lead poured into said channel is prevented from overflowing said end walls and forming projections extending beyond said end walls; and
    (b) at least one projection extending from at least one of said end walls into said mold channel, said projection having a width which is less then the width of said channel and a beveled top surface which forms a continuation of the beveled segment of said end wall.

2. The invention of claim 1 wherein the length of said molding channel is less than the width of said row of lugs.

3. The invention of claim 1 wherein at least one of said channels has a strap portion which extends along said surface of said block and an intermediate post portion which extends generally perpendicularly away from said strap portion into said main block, said intermediate post portion being disposed at the end of said channel opposite said projection.

4. A mold apparatus for forming a plurality of battery straps and posts in substantially parallel and spaced apart rows of positive and negative lugs of a plurality of battery stacks, comprising:
    (a) a mold block comprising a plurality of mold channels disposed in a surface of said mold block to receive said rows of positive and negative lugs;
    (b) said mold block further comprising a plurality of fixed mold portions, each of said fixed mold portions forming a first end of at least one mold channel and having a segment which extends beyond the surface of said mold block, a portion of said segment being beveled away from said mold channel, the width of said segment extending beyond the width of said mold channel;
    (c) a plurality of removable mold insert portions for engagement with said mold block, each of said insert portions forming a second end of at least one of said channels and having a segment which extends beyond the surface of said mold block, a portion of said segment being beveled away from said mold channel, the width of said segment extending beyond the width of said mold channel; and
    (d) at least one projection extending from at least one of said portions into at least one of said mold channels, said projection having a width which is less than the width of said channel and a beveled top surface which forms a continuation of the beveled portion of said segment.

5. The invention of claim 4 wherein said projection extends from said second end.

6. The invention of claim 5 wherein the lengths of said channels are less than the widths of said rows of lugs on said stacks.

7. The invention of claim 5 wherein a plurality of said channels are intermediate post channels, said intermediate post channels having a strap portion which extends along said surface of said block, and an intermediate post portion which extends generally perpendicularly away from said strap portion into said mold block, said intermediate post portion being located at said first end of said channel opposite said projection, said intermediate post end of said channel having a flat surface.

8. The invention of claim 5 wherein at least two of said channels are terminal post channels, said terminal post channels having a strap portion which extends along said surface of said block, and a terminal post portion which extends generally perpendicularly away from said strap portion, said terminal post portion being located intermediate the ends of said channel.

9. The invention of claim 5 wherein a plurality of insert portions have projections on each end.

10. The invention of claim 8 wherein said terminal, post channels have projections into said channels from each end of said channel.

11. The invention of claim 4 wherein said mold comprises twelve sub-channel portions for molding straps on six battery stacks simultaneously.

* * * * *